No. 758,434. PATENTED APR. 26, 1904.
F. E. FORSTER.
CHUM DELIVERING APPARATUS.
APPLICATION FILED NOV. 18, 1903.
NO MODEL.
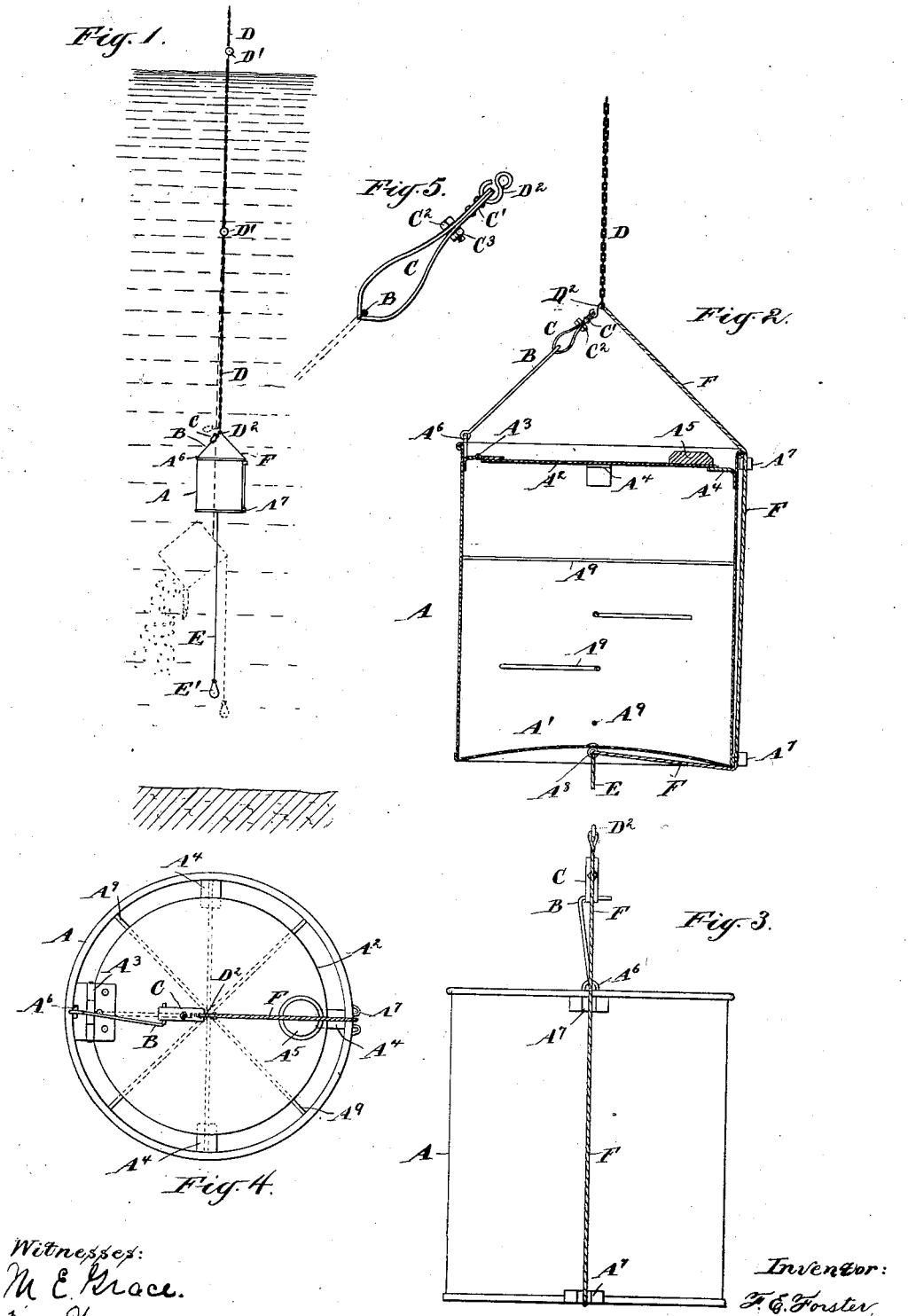
Witnesses:
M. E. Grace.
Henry Wagner.
Inventor:
F. E. Forster
By his attorney
Charles R. Searle No. 758,434. Patented April 26, 1904.

UNITED STATES PATENT OFFICE.

FERDINAND E. FORSTER, OF NEW YORK, N. Y.

CHUM-DELIVERING APPARATUS.

SPECIFICATION forming part of Letters Patent No. 758,434, dated April 26, 1904.

Application filed November 18, 1903. Serial No. 181,587. (No model.)

*To all whom it may concern:*

Be it known that I, FERDINAND E. FORSTER, a citizen of the United States, residing in the city of New York, borough of Manhattan, in the county and State of New York, have invented a certain new and useful Improvement in Chum-Delivering Apparatus, of which the following is a specification.

The invention relates to means for feeding chum or free bait for the purpose of attracting fish to the vicinity of the fisherman.

In feeding chum by hand or machine upon the surface of the water, especially in strong currents, the bait is distributed over too great an area or is liable to be carried away by the tide or current.

The object of this invention is to provide means whereby the chum may be delivered on or near the bottom at the point desired.

The invention consists in certain novel features and arrangements of parts by which the above objects are attained, to be hereinafter described.

The accompanying drawings form a part of this specification and show a preferred form of the invention.

Figure 1 is a view of the apparatus in service. The full lines show the receptacle suspended in the upright position, and the dotted lines show the condition in the act of discharging. Fig. 2 is a vertical section, partly in elevation, showing the receptacle and immediately-connected parts on a larger scale. Fig. 3 is a corresponding side elevation, and Fig. 4 is a plan or top view. Fig. 5 is an elevation, on a still larger scale, showing the releasing mechanism.

Similar letters of reference indicate the same parts in all the figures.

A is the receptacle, shown as of sheet metal in cylindrical form, having a bottom $A'$, of perforated metal, wire-gauze, or the like, and a cover $A^2$, of less diameter than the receptacle, hinged thereto at $A^3$ to lie below the top thereof and supported by arms $A^4$ $A^4$ on the interior. The cover is closed when the receptacle is in the upright position by a weight $A^5$, attached at a point opposite the hinge, the weight also serving to swing the cover to the open position by gravity when the receptacle is reversed, as indicated by the dotted lines in Fig. 1.

$A^6$ is an eye, of wire, fixed to the receptacle near the hinge $A^3$ and carrying a wire hook B.

D is a suspension connection, shown as a chain, by which the receptacle is submerged to the desired depth, the distance being indicated by peculiar links at equally-spaced intervals, which may be the balls $D'$, colored or otherwise marked to aid in the measurement. Attached to the chain is a link $D^2$, in which is secured one end of a cord F, the other end being attached to an eye $A^8$ at the center of the bottom $A'$ and lying in open guides $A^7$ $A^7$ near the top and bottom of the receptacle when the latter is in the upright condition. The link $D^2$ also carries a spring-loop C, formed of two leaves, of spring metal, riveted together at $C'$ at one end, the free ends lying in contact, but easily separated. The resistance to thus spreading may be adjusted by a bolt $C^2$, extending through both leaves near the rivet $C'$ and having a nut $C^3$, by which the jaws or free ends may be forced together with the desired tension. The spring-loop receives the arm of the hook B, above mentioned, and the latter, with the cord F, serves as a bail for the receptacle when the latter is lowered by the chain D. To aid in maintaining the receptacle in the upright condition during the lowering and to insure a more perpendicular descent in a current, a weight or plummet $E'$ is attached to the eye $A^8$ by a cord or chain E.

The receptacle is charged with a quantity of chum, the cover is shut down, and the hook B engaged in the loop C. The whole is then lowered to the desired depth in the water, the perforated bottom allowing free ingress to the water and the annular space around the cover permitting the air to escape and water to fill and circulate freely. When the desired depth is attained, a sudden upward movement or jerk on the chain D overcomes the resistance of the spring-loop C and releases the hook B. The cord F, forming, in effect, a continuation of the chain and secured to the bottom of the receptacle, causes the latter to reverse its position, the cover at the same time swinging open by reason of its weight and allows the contents to escape.

In order to scatter the chum slightly in its discharge, I introduce wires $A^9 A^9$, arranged transversely of the receptacle, serving to interfere with the delivery of the chopped fish, clams, or the like usually employed as chum and prevent the escape in a solid mass.

The apparatus may be of any size, either large for service on fishing steamers or vessels or of small capacity for convenient carriage as part of a fisherman's kit.

Other modifications may be made in the forms of the parts. The cover may be of perforated metal, the flexible connections may be chains or cords, and any separable means operated by the suspension connection may be substituted for the hook and spring-loop.

I claim—

1. In an apparatus of the character set forth, a receptacle, a suspension connection attached thereto and arranged to maintain said receptacle temporarily in an upright position, and separable means between said receptacle and connection whereby a sudden lifting movement of said connection reverses said receptacle.

2. In an apparatus of the character set forth, a receptacle, a suspension connection attached to the bottom of said receptacle and extending loosely up one side thereof, separable means between the upper portion of said receptacle and said connection above said receptacle, for holding the latter temporarily upright, whereby a sudden lifting movement of said connection separates said means and permits the reversal of said receptacle.

3. In an apparatus of the character set forth, a receptacle, a suspension connection attached to the bottom of said receptacle and extending loosely up one side thereof, separable means between the upper portion of said receptacle and said connection above said receptacle, for holding the latter temporarily upright whereby a sudden lifting movement of said connection separates said means and permits the reversal of said receptacle, and a weighted cover hinged to said receptacle and arranged to lie in the closed position by gravity when said receptacle is in the upright position, and to open by gravity when said receptacle is reversed.

4. In an apparatus of the character set forth, a receptacle, a suspension connection therefor, a spring-loop attached to said connection, a hook secured to the upper portion of said receptacle, and adapted to engage said loop, a cord forming a continuation of said connection and extending therefrom to the lower portion of said receptacle, the said cord serving to maintain the receptacle in an upright position when said hook and loop are engaged and said cord serving to reverse said receptacle when such engagement is broken by a sudden lifting movement of said suspension connection.

5. In an apparatus of the character set forth, a receptacle, a suspension connection attached thereto and arranged to maintain said receptacle temporarily in an upright position, separable means between said receptacle and connection whereby a sudden lifting movement of said connection reverses said receptacle, and a weight suspended from the lower portion of said receptacle serving to aid in its submergence and as ballast therefor.

6. A receptacle having a perforated bottom, a cover smaller than the open top of said receptacle and partially closing it when said receptacle is in an upright position, a weight secured to said cover and serving by gravity to hold it in the closed condition when said receptacle is upright and to hold it in an open condition when said receptacle is reversed, and means for submerging said receptacle and reversing it while submerged.

7. A receptacle having a perforated bottom, a cover partially closing the open top of said receptacle and arranged to be held in the closed condition by gravity when said receptacle is in the upright position, and in the open condition when said receptacle is reversed, bars extending transversely of the interior of said receptacle for preventing the sudden escape of the contents when reversed, and means for submerging said receptacle and reversing it while submerged.

8. In an apparatus of the character set forth, a receptacle, a suspension-chain attached thereto and arranged to maintain said receptacle temporarily in an upright position when submerged, separable means between said receptacle and chain whereby a sudden lifting movement of said chain reverses said receptacle, and distinctive links at intervals in said chain to aid in determining the depth at which said receptacle is submerged.

In testimony that I claim the invention above set forth I affix my signature in presence of two witnesses.

FERDINAND E. FORSTER.

Witnesses:
   Chas. A. Hauck,
   Charles R. Searle.